Patented July 28, 1936

2,049,402

UNITED STATES PATENT OFFICE 2,049,402

PROCESS FOR PREPARING SALTS OF COPPER

Christian John Wernlund, Niagara Falls, N. Y., assignor to E. I. du Pont de Nemours & Company, Inc., Wilmington, Del., a corporation of Delaware No Drawing. Application September 19, 1932, Serial No. 633,853

8 Claims. (Cl. 23—97)

This invention relates to a process for dissolving copper and more particularly to a method for making an aqueous solution of cuprous chloride from metallic copper.

Aqueous solutions of copper salts are required for various industrial purposes. For instance, solutions of cuprous chloride are reacted with alkali metal cyanide to manufacture cuprous cyanide.

A number of methods have been proposed for preparing the chlorides of copper, the more important of which will be mentioned here. One method comprises heating metallic copper with chlorine gas at a temperature above the melting point of the resulting copper chloride. This method may be used for producing either cupric or cuprous chloride, by having either the chlorine or the copper in excess. Another method comprises reacting hydrochloric acid solution with a copper oxide. Cupric chloride may be prepared by reacting metallic copper with hydrochloric acid in the presence of small amounts of nitric acid or similar oxidizing agent which is added to the solution from time to time. The method for producing cuprous chloride heretofore chiefly used comprises reducing a solution of cupric chloride in hydrochloric acid by heating it with metallic copper.

A proposed method for producing cuprous chloride comprises contacting metallic copper with an aqueous solution of cuprous and cupric chlorides and ammonium chloride, passing chlorine through the solution to dissolve copper and thereafter allowing the solution to stand in the presence of metallic copper without further addition of chlorine. In this process, the ammonium salt is said to cause substantially complete reduction of the cupric chloride to cuprous chloride. Certain precautions must be observed to prevent reaction of chlorine with the ammonium salt to form the highly explosive nitrogen trichloride.

The object of this invention is to prepare aqueous solutions of cuprous chloride by the direct action of chlorine on metallic copper at relatively low temperatures and in the presence of water.

I have discovered an aqueous solution of cuprous chloride, substantially free from cupric salts, may be prepared by reacting metallic copper with a cupric chloride solution containing an alkali metal salt, for instance sodium chloride, in the absence of ammonium salts. The cupric chloride solution advantageously may be prepared by passing chlorine into a solution containing alkali metal chloride and a small amount of a copper salt in contact with metallic copper.

In one method of preparing a solution of cuprous chloride according to my invention, I pass chlorine into a solution containing cupric or cuprous chloride, and an alkali metal chloride, for instance sodium chloride, in the presence of metallic copper. When sufficient of the metallic copper has been dissolved, the flow of chlorine is stopped and the solution is allowed to stand in contact with metallic copper until substantially all the cupric chloride has been reduced to cuprous chloride. Preferably, the reduction of the cupric chloride by metallic copper is carried out at around 80° C.

Another method of preparing cuprous chloride according to my invention comprises first preparing a solution of cupric chloride, for instance, by the above described method, adding thereto alkali metal salt and reacting the resulting solution with metallic copper.

In preparing cuprous chloride according to my invention, I prefer to exclude air or oxygen from the reaction mixture, at least during the reduction step. This may be done by keeping the solutions under an atmosphere of oxygen-free gas, for instance, nitrogen. Obviously, it is also preferable to keep from the solutions other gases which may react therewith, for instance carbon dioxide, hydrogen sulfide, or sulfur dioxide, if a pure product is desired.

Example

Approximately 373 grams of copper wire were immersed in 310 cc. of a solution containing 51.4 g./l. of dissolved copper as cupric chloride and 100 g./l. of sodium chloride. The solution was then maintained at 80 to 85° C. under an atmosphere of oxygen-free nitrogen while stirring moderately by bubbling oxygen-free nitrogen gas therethrough. At the end of 2 hours, the cupric copper was entirely reduced to cuprous chloride.

In both the chlorination and reduction steps it is preferable to maintain the temperature at between 80° C. and the boiling point of the solution. Since the reactions are exothermic, it is ordinarily unnecessary to supply heat for such temperature control. The reaction may also be carried out at lower temperatures, for instance, I have obtained complete chlorination and complete reduction at temperatures as low as 25° C. However, at these lower temperatures the time required to complete the reaction is longer. In the chlorination step, the chlorine may be passed in at any desired rate. I prefer to add the chlorine at the greatest rate possible while obtaining complete chlorine absorption. Obviously, the maximum rate for complete chlorine absorption is greater at the higher temperatures, and in any case may be readily determined by experiment. In both reactions, the solutions may be neutral or acidified as desired. A small amount of an acid such as hydrochloric acid apparently has no substantial effect upon the course of the reaction.

The copper salt concentration required at the start of the chlorination step may vary within wide limits. For instance, the process may be successfully operated if as little as 1% by weight of copper salt is initially present. In this case, the reaction is slow at first, but after a time, the cupric salt concentration increases and the reaction then proceeds at normal speed. In place of cupric chloride as shown in the example, other soluble cuprous or cupric salts may be employed to start the reaction, for instance, sulfates.

The concentration of alkali metal chloride may be varied greatly in accordance with the amount of cuprous chloride to be prepared. I prefer to use at least 10% by weight of alkali metal chloride; for example, I have used sodium chloride in concentrations from 15 to 30% by weight with satisfactory results.

If it is desired to produce solid cuprous chloride, it may be recovered from the solutions produced by my process. For instance, a solution of cuprous chloride, prepared by my invention, may be treated to precipitate solid cuprous chloride, for example, by diluting the solution with cold water until precipitation is complete.

Impurities in the copper, e. g. other metals or oxides, have no appreciably deleterious effect upon the course of the reactions, although such impurities of course may result in the introduction of impurities in the copper chloride solutions produced. The process may employ copper alloys instead of pure copper, in which case the resulting solution may contain chlorides of the other metals present.

My process employs relatively inexpensive raw materials and simple apparatus and does not require the application of heat. It does not employ chemicals which are liable to form dangerously explosive substances. A further advantage is that the initial chlorination solution may contain any soluble copper salt; it is not necessary to have cuprous ions present before starting chlorination. For these reasons it affords a simpler and less expensive method of manufacturing cuprous chloride than has heretofore been proposed.

I claim:

1. A process for the manufacture of cuprous chloride which comprises reacting copper with chlorine in the presence of an aqueous solution containing a copper salt and an alkali metal chloride, said solution being substantially free from ammonium salts, and reacting the resulting solution with copper in the absence of substantial amounts of free chlorine.

2. A process for the manufacture of cuprous chloride which comprises reacting copper with chlorine at a temperature of about 80 to 100° C. in the presence of an aqueous solution containing cupric chloride and an alkali metal chloride, said solution being substantially free from ammonium salts, and reacting the resulting solution with copper at around 80 to 100° C. in the presence of substantial amounts of free chlorine.

3. A process for the manufacture of cuprous chloride which comprises reacting copper with chlorine at a temperature of about 80 to 100° C. in the presence of an aqueous solution containing cupric chloride and at least 10% by weight of sodium chloride, said solution being substantially free from ammonium salts, and reacting the resulting solution with copper at a temperature of about 80 to 100° C. in the absence of substantial amounts of free chlorine.

4. A process for the manufacture of cuprous chloride which comprises reacting copper with chlorine at a temperature of about 80 to 100° C. in the presence of an aqueous solution containing cupric chloride and 15 to 30% by weight of sodium chloride, said solution being substantially free from ammonium salts, and reacting the resulting solution with copper at a temperature of about 80 to 100° C. in the absence of substantial amounts of free chlorine.

5. A process for the manufacture of cuprous chloride which comprises reacting copper with chlorine in the presence of an aqueous solution containing a copper salt and an alkali metal chloride, said solution being substantially free from ammonium salts, reacting the resulting solution with copper in the absence of substantial amounts of free chlorine and, thereafter, diluting the solution with water to precipitate solid cuprous chloride.

6. A process for the manufacture of cuprous chloride which comprises reacting copper with chlorine at a temperature of 80 to 100° C. in the presence of an aqueous solution containing cupric chloride and at least 10% of sodium chloride, said solution being substantially free from ammonium salts, reacting the resulting solution with copper at a temperature of 80 to 100° C. in the absence of substantial amounts of free chlorine and, thereafter, diluting the solution with water to precipitate solid cuprous chloride.

7. A process for the manufacture of cuprous chloride which comprises reacting copper with a solution containing cupric chloride and an alkali metal chloride, said solution being substantially free from ammonium salts, and thereafter, diluting the solution with water to precipitate solid cuprous chloride.

8. A process for the manufacture of cuprous chloride which comprises reacting copper with a solution containing cupric chloride and at least 10% of sodium chloride, said solution being substantially free from ammonium salts, and, thereafter, diluting the solution with water to precipitate solid cuprous chloride.

CHRISTIAN JOHN WERNLUND.